UNITED STATES PATENT OFFICE 1,991,743

PROCESS FOR THE PREPARATION OF ALKYL ARYL KETONES ACCORDING TO THE FRIEDEL AND CRAFTS REACTION

Philip H. Groggins, Washington, D. C., assignor to Secretary of Agriculture of the United States of America No Drawing. Application May 28, 1934, Serial No. 727,948

6 Claims. (Cl. 260—131)

(Granted under the act of March 3, 1883, as amended April 30, 1928; 370 O. G. 757)

This application is made under the act of March 3, 1883, as amended by the act of April 30, 1928, and the invention herein described and claimed may be manufactured and used by or for the Government for governmental purposes without the payment to me of any royalty thereon.

This invention relates to an improved process for the preparation of commercially important ketones by the Friedel and Crafts reaction, and more particularly to the preparation of alkyl aryl ketones by condensing aliphatic acid anhydrides with aromatic compounds.

I have discovered that the condensation of aliphatic carboxylic acid anhydrides with aromatic compounds according to the Friedel and Crafts reaction takes place best in the presence of three or more molecular proportions of aluminum chloride. Hitherto these condensations have been carried out with approximately two moles of the aluminum halide and yields of approximately 100 per cent, based on one acyl group have been obtained. It was not recognized that the second acyl group in aliphatic carboxylic acid anhydrides could be made available for reaction. The first intimation that the second acyl group in aliphatic carboxylic acid anhydrides could be made available for reaction came as a result of the following two discoveries:

(1) Aliphatic unsubstituted carboxylic acids would condense according to the Friedel and Crafts reaction;

(2) The residue obtained by the treatment of aliphatic carboxylic acid anhydrides with aluminum chloride after the volatile acid halide was removed could also be made to react according to the Friedel and Crafts reaction.

These discoveries are taught by application for Letters Patent filed August 31, 1933, bearing Serial # 687,640 and March 9, 1934, bearing Serial #714,830, respectively.

As a result of my researches I have discovered that the second acyl group in aliphatic carboxylic acid anhydrides can be made to react and that yields of 150–160 per cent, based on one acyl group, can now be obtained.

Without limiting myself to any theoretical explanation of the vastly improved results which can be obtained by the within described process, it is believed that the need for three molecular proportions of aluminum chloride per molecular proportion of aliphatic carboxylic acid anhydrid may be accounted for as follows:

The first mole accomplishes the fission of the anhydride with the production of an acid halide and the formation of the aluminum chloride salt of the carboxylic acid. In the case of acetic anhydride the reactions may be written as follows:

I.
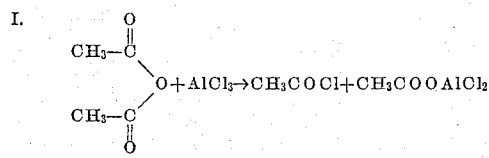

It has been shown, in application bearing Serial #714,830 that acid halides can be distilled over by such a treatment.

When two moles of aluminum chloride are employed, the acid chloride which is first formed combines with the aluminum halide to form the non-volatile active complex, which in the presence of aromatic compounds reacts according to the normal Friedel and Crafts reaction, thus:

II.
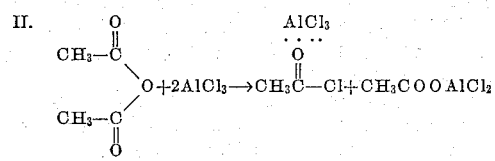

It is apparent from Equation II that the maximum yields obtainable with approximately two molecular proportions of aluminum chloride would be about 100 per cent based on one acyl group. The second acyl group is fixed as the aluminum chloride salt. I have discovered that this salt can also be made to react by adding a third molecular proportion of aluminum chloride. The reaction is substantially as follows:

III.
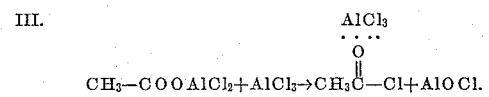

From Equation III, it can be seen that the function of the third molecular proportion is to convert the aluminum chloride salt of the carboxylic acid to the active aluminum chloride addition complex of an acid halide.

I have discovered that it is not necessary to add the aluminum chloride at once, but may be introduced over a period of several hours. I have also ascertained that the synthesis may be carried out in two vessels, in the first the volatile acid chloride obtained according to Equation I is made to react with aromatic compounds in the presence of at least one molecular proportion of aluminum chloride. In the second, the charge which contains only the aluminum chloride salt of the carboxylic acid, Equation I, is treated with a second molecular proportion of aluminum chloride to form the active complex, Equation III. In any event, to obtain the best results in such condensations I have discovered that it requires at least three molecular proportions of aluminum chloride per molecular proportion of aliphatic carboxylic acid anhydride.

The condensation may be carried out in any suitable agitated vessel, which insures a practically homogeneous reaction mass. Iron vessels do not appear to affect the quality or quantity of the desired ketone.

The following example will serve to illustrate the nature of my invention, although it is not to be limited thereby:

*Example I*

A charge comprising:

| | Grams |
|---|---|
| Acetic anhydride, 2 moles | 204 |
| Aluminum chloride, 6.6 moles | 890 |
| Chlorobenzene, 8 moles | 900 | was stirred at room temperature in an iron reactor for about three hours, and then at 50–60° C. for 5 hours. It was finally heated to 100–110° C. for a further period of 6 hours, after which it was hydrolyzed by running into iced sulfuric acid. During the course of the run the escape of the liberated hydrogen chloride was facilitated by passing a current of dry air over the charge.

The oily layer of the hydrolyzed mass was thoroughly washed with water and then heated up to 200° C. to remove the excess of chlorobenzene. The yield of crude 4-chloroacetophenone thus obtained was 526 grams or 170 per cent based on one acetyl. On vacuum distillation, there was obtained 490 grams of ketone boiling over a range of 89.5°–91.0° C. at 5 mm. This corresponds to a yield of 158.6 per cent, pure product, which is at least 50 per cent greater than that previously reported in the literature.

Other experiments in which finely divided metallic iron and/or aluminum were added to the charge, to inhibit attack on the iron reactor did not markedly affect the above results. When the molecular ratio of aluminum chloride to acetic anhydride was 4.4, the yields were only slightly higher, presumably because the reaction proceeded a little further in a comparable period.

The temperatures at which these reactions may be carried out vary with the molecular weight of the carboxylic acid anhydride employed, and the nature of the aromatic compound being condensed. Generally temperatures of 30° to 200° C. will suffice for the anhydrides of acetic to valeric acids.

In preparing ketones according to my invention, other Friedel and Crafts condensing agents, such as aluminum bromide, or ferric halides, may be employed instead of aluminum chloride.

Among the aromatic compounds which I have found to give excellent results in such condensations may be mentioned benzene, toluene, xylenes, and chlorobenzenes.

As many apparent and widely different embodiments of my invention can be made without departing from the spirit thereof, it is understood that I do not limit myself to the foregoing examples or descriptions, except as indicated in the following claims.

I claim:

1. A process for the preparation of alkyl aryl ketones, which comprises condensing one molecular proportion of an aliphatic carboxylic acid anhydride with an aromatic compound in the presence of at least three molecular proportions of a Friedel and Crafts condensing agent.

2. A process for the preparation of alkyl aryl ketones, which comprises condensing one molecular proportion of an aliphatic carboxylic acid anhydride with an aromatic compound in the presence of at least three molecular proportions of anhydrous aluminum chloride.

3. A process for the preparation of alkyl aryl ketones which comprises condensing an aliphatic carboxylic acid anhydride with an aromatic compound in the presence of at least three molecular proportions of anhydrous aluminum chloride at 30°–200° C.

4. A process for the preparation of acetophenones, which comprises condensing one molecular proportion of acetic anhydride with an aromatic compound in the presence of at least three molecular proportions of anhydrous aluminum chloride.

5. A process for the preparation of 4-chloroacetophenone, which comprises condensing one molecular proportion of acetic anhydride with chlorobenzene in the presence of at least three molecular proportions of anhydrous aluminum chloride at 30°–105° C.

6. A process for the preparation of 4-methylpropiophenone, which comprises condensing one molecular proportion of propionic anhydride with toluene in the presence of at least three molecular proportions of anhydrous aluminum chloride.

PHILIP H. GROGGINS.